United States Patent
Wu et al.

(10) Patent No.: US 8,456,119 B2
(45) Date of Patent: Jun. 4, 2013

(54) DRIVING DEVICE OF BRUSHLESS DC MOTOR FOR FAN AND DRIVING METHOD THEREOF

(75) Inventors: Yen-Hung Wu, Taoyuan Hsien (TW); Tsung-Jung Hsieh, Taoyuan Hsien (TW)

(73) Assignee: Delta Electronics, Inc., Kuei San, Taoyuan Hsien (TW)

(*) Notice: Subject to any disclaimer, the term of this patent is extended or adjusted under 35 U.S.C. 154(b) by 224 days.

(21) Appl. No.: 13/098,729

(22) Filed: May 2, 2011

(65) Prior Publication Data
US 2012/0068650 A1   Mar. 22, 2012

(30) Foreign Application Priority Data
Sep. 17, 2010   (CN) .......................... 2010 1 0288070

(51) Int. Cl.
*H02P 6/14*    (2006.01)
*H02P 1/18*    (2006.01)

(52) U.S. Cl.
USPC ........ 318/400.42; 318/254; 318/430; 361/79; 361/80

(58) Field of Classification Search
USPC ............... 318/400.42, 254, 430, 434; 361/79, 361/80, 103
See application file for complete search history.

(56) References Cited

U.S. PATENT DOCUMENTS

| | | | | |
|---|---|---|---|---|
| 7,692,908 B2* | 4/2010 | Chen et al. | | 361/82 |
| 8,183,807 B2* | 5/2012 | Tsai et al. | | 318/400.35 |
| 2007/0285038 A1* | 12/2007 | Tsai et al. | | 318/434 |
| 2008/0218917 A1* | 9/2008 | Archer | | 361/33 |
| 2009/0168276 A1* | 7/2009 | Chen et al. | | 361/33 |
| 2010/0066279 A1* | 3/2010 | Frankel et al. | | 318/379 |
| 2010/0134054 A1* | 6/2010 | Tseng et al. | | 318/400.3 |
| 2010/0259203 A1* | 10/2010 | Hogg et al. | | 318/139 |
| 2011/0062910 A1* | 3/2011 | Tsai et al. | | 318/400.35 |
| 2012/0286681 A1* | 11/2012 | Hausman, Jr. | | 315/200 R |

\* cited by examiner

*Primary Examiner* — Paul Ip
(74) *Attorney, Agent, or Firm* — Muncy, Geissler, Olds & Lowe, PLLC

(57) ABSTRACT

A driving device of a brushless DC motor for a fan includes a protection circuit, a storage circuit, a control circuit and a bridge circuit. The protection circuit is electrically connected with an auxiliary power. The storage circuit electrically connected with the protection circuit receives the auxiliary power. The control circuit is electrically connected with the protection circuit and the storage circuit. The bridge circuit electrically connected with the control circuit has a first switching unit, a second switching unit, a third switching unit and a fourth switching unit. The first and second switching units are coupled with one end of a motor coil. The third switching unit and the fourth switching unit are coupled with the other end of the motor coil. The first switching unit is electrically connected with the third switching unit, and the second switching unit is electrically connected with the fourth switching unit.

12 Claims, 6 Drawing Sheets

|  | First operation period | Second operation period | Third operation period |
|---|---|---|---|
| First control signal | Low level | High level | Low level |
| Second control signal | High level | Low level | High level |
| Third control signal | Low level | Low level | High level |
| Fourth control signal | High level | High level | Low level |
| First switching unit | Turn-off state | Turn-on state | Turn-off state |
| Second switching unit | Turn-on state | Turn-off state | Turn-on state |
| Third switching unit | Turn-off state | Turn-off state | Turn-on state |
| Fourth switching unit | Turn-on state | Turn-on state | Turn-off state |
| Fifth switching unit | Turn-off state | Turn-on state | Turn-off state |
| Sixth switching unit | Turn-off state | Turn-on state | Turn-off state |
| Seventh switching unit | Turn-off state | Turn-off state | Turn-on state |
| Eighth switching unit | Turn-off state | Turn-off state | Turn-on state |

DRIVING DEVICE OF BRUSHLESS DC MOTOR FOR FAN AND DRIVING METHOD THEREOF

CROSS REFERENCE TO RELATED APPLICATIONS

This Non-provisional application claims priority under 35 U.S.C. §119(a) on Patent Application No(s). 201010288070.3 filed in People's Republic of China on Sep. 17, 2010, the entire contents of which are hereby incorporated by reference.

BACKGROUND OF THE INVENTION

1. Field of Invention

The invention relates to a driving device and a driving method thereof, and in particular, to a driving device of a brushless DC motor for a fan and a driving method thereof.

2. Related Art

FIG. 1A is a schematic illustration showing a conventional driving device 1A of a brushless DC motor for a fan. As shown in FIG. 1A, the driving device 1A adopts two N-type metal-oxide semiconductor (NMOS) field-effect transistors (FETs) serving as switches to drive the Brushless DC motor. Although the driving device 1A has the advantages of the simple structure and the low price, the driving device 1A has the lower efficiency, and thus disobeys the environment protection concept and the energy saving concept, which are currently emphasized.

In order to enhance the efficiency of the driving device, a driving device 1B with the full-bridge architecture has been proposed. Referring to FIG. 1B, the driving device 1B includes an upper bridge circuit and a lower bridge circuit. The upper bridge circuit is composed of two P-type metal-oxide semiconductor (PMOS) FETs, while the lower bridge circuit is composed of two NMOS FETs.

Although the driving device 1B has the higher efficiency, the behaviors of the PMOS FET on the switching speed and the switching loss cannot be better that those of the NMOS FET. Thus, when the fan with the higher power is applied or the driving technology requiring the higher switching speed is needed, the typically solution is to change the PMOS FETs in the upper bridge circuit into the NMOS FETs.

In order to match with the operation property of the NMOS FET, an integrated driving IC is usually used to control the driving device when the upper and lower bridge circuits are the motor driving devices using the NMOS FETs. However, the integrated driving IC has the higher price, and the operation voltage ranges between 10 to 20 volts. Thus, when the driving power of the selected fan is lower than 10 volts, the integrated driving IC cannot work normally.

Thus, it is an important subject to provide a driving device of a brushless DC motor for a fan and a driving method thereof, so that the simple structure can be obtained, the wider range of the operation voltage can be obtained, and the utility of the driving device and the quality of the motor can be enhanced.

SUMMARY OF THE INVENTION

In view of the foregoing, an objective of the invention is to provide a driving device of a brushless DC motor for a fan and a driving method thereof, so that the simple structure can be obtained, the wider range of the operation voltage can be obtained, and the utility of the driving device and the quality of the motor can be enhanced.

To achieve the above objective, the invention discloses a driving device of a brushless DC motor for a fan. The driving device includes a protection circuit, a storage circuit, a control circuit and a bridge circuit. The protection circuit is electrically connected with an auxiliary power. The storage circuit is electrically connected with the protection circuit. The control circuit is electrically connected with the protection circuit and the storage circuit, and receives a first control signal, a second control signal, a third control signal and a fourth control signal. The bridge circuit is electrically connected with the control circuit and has a first switching unit, a second switching unit, a third switching unit and a fourth switching unit. The first switching unit and the second switching unit are coupled with one end of a motor coil. The third switching unit and the fourth switching unit are coupled with the other end of the motor coil. The first switching unit is electrically connected with the third switching unit, and the second switching unit is electrically connected with the fourth switching unit. The control circuit turns on the second switching unit and the fourth switching unit in a first operation period, turns on the first switching unit and the fourth switching unit in a second operation period, and turns on the second switching unit and the third switching unit in a third operation period. The storage circuit receives the auxiliary power in the first operation period.

In one embodiment of the invention, each of the first switching unit, the second switching unit, the third switching unit and the fourth switching unit of the bridge circuit is an N-type metal-oxide semiconductor (NMOS) field-effect transistor (FET).

To achieve the above objective, the invention further discloses a driving method of a brushless DC motor for a fan, which is used in conjunction with a driving device. The driving device has a protection circuit, a storage circuit, a control circuit and a bridge circuit. The protection circuit is electrically connected with an auxiliary power. The storage circuit is electrically connected with the protection circuit. The control circuit is electrically connected with the protection circuit and the storage circuit, and receives a first control signal, a second control signal, a third control signal and a fourth control signal. The bridge circuit is electrically connected with the control circuit, and the bridge circuit has a first switching unit, a second switching unit, a third switching unit and a fourth switching unit. The first switching unit and the second switching unit are coupled with one end of a motor coil, and the third switching unit and the fourth switching unit are coupled with the other end of the motor coil. The first switching unit is electrically connected with the third switching unit, and the second switching unit is electrically connected with the fourth switching unit. The driving method includes the steps of: respectively turning on the second switching unit and the fourth switching unit according to the second control signal and the fourth control signal in a first operation period, such that the storage circuit receives and stores the auxiliary power in the first operation period, and enters one of a second operation period and a third operation period; respectively turning on the first switching unit and the fourth switching unit according to the first control signal and the fourth control signal in the second operation period, and entering the third operation period; and respectively turning on the second switching unit and the third switching unit according to the second control signal and the third control signal in the third operation period, and entering the second operation period.

In one embodiment of the invention, the voltage of the auxiliary power ranges between 4 and 20 volts.

As mentioned above, the driving device of the brushless DC motor for the fan and the driving method thereof according to the invention provide the voltage levels, required to turn on the first switching unit and the third switching unit of the bridge circuit, using the storage circuit in conjunction with the control circuit. Thus, the simple structure can be implemented, the wider range of the operation voltage can be obtained, and the utility of the driving device and the quality of the motor can be enhanced.

BRIEF DESCRIPTION OF THE DRAWINGS

The present invention will become more fully understood from the subsequent detailed description and accompanying drawings, which are given by way of illustration only, and thus are not limitative of the present invention, and wherein:

FIG. 5 is a schematic illustration showing statuses between control signals of switching units of a control circuit according to the preferred embodiment of the invention.

DETAILED DESCRIPTION OF THE INVENTION

The present invention will be apparent from the following detailed description, which proceeds with reference to the accompanying drawings, wherein the same references relate to the same elements.

Figure 1A:
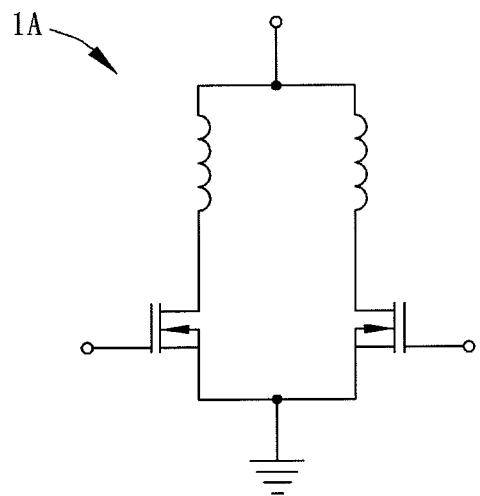
FIGS. 1A and 1B are schematic illustrations showing conventional driving devices of brushless DC motors for fans.
Figure 1B:
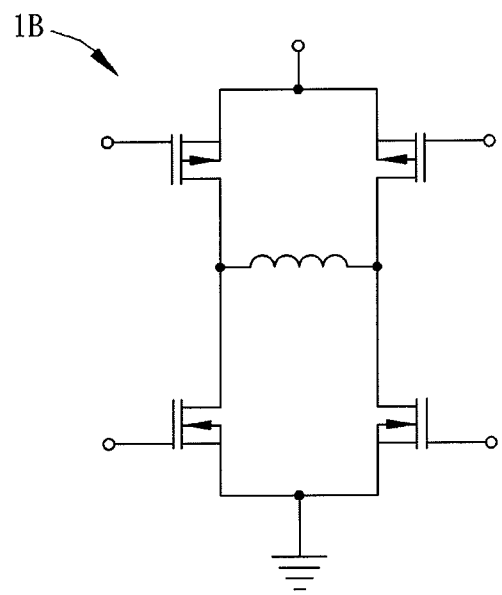
Figure 2:
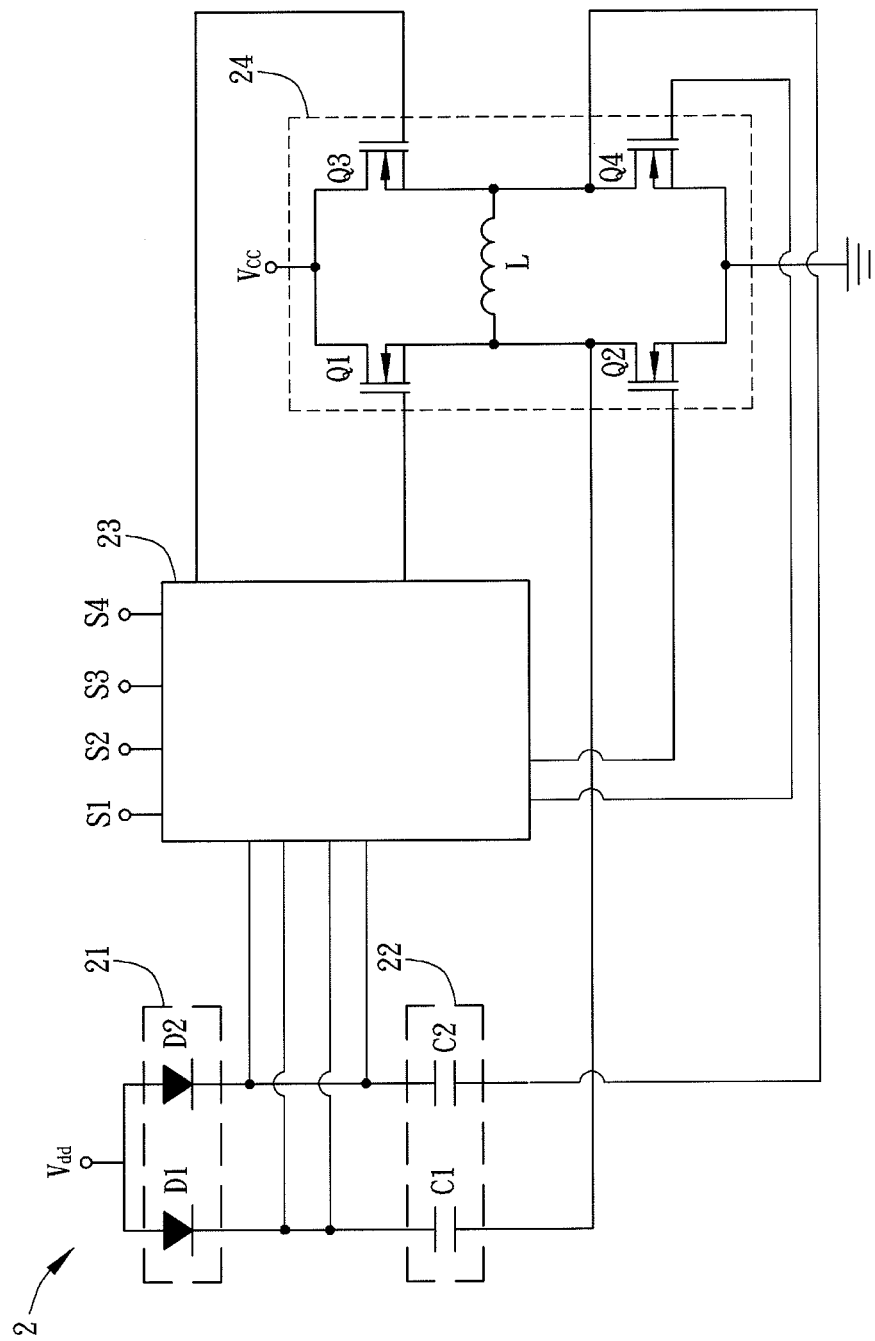
FIG. 2 is a schematic illustration showing a driving device of a brushless DC motor for a fan according to a preferred embodiment of the invention.

FIG. 2 is a schematic illustration showing a driving device 2 of a brushless DC motor for a fan according to a preferred embodiment of the invention. Referring first to FIG. 2, the driving device 2 includes a protection circuit 21, a storage circuit 22, a control circuit 23 and a bridge circuit 24.

The protection circuit 21 is electrically connected with an auxiliary power $V_{dd}$. In this embodiment, the protection circuit 21 has a first protection unit D1 and a second protection unit D2. In practice, each of the first protection unit D1 and the second protection unit D2 may be a diode.

The storage circuit 22 is electrically connected with the protection circuit 21. In this embodiment, the storage circuit 22 has a first capacitor C1 and a second capacitor C2, which are electrically connected with the first protection unit D1 and the second protection unit D2, respectively.

The first protection unit D1 and the second protection unit D2 can provide charging paths to the first capacitor C1 and the second capacitor C2 and can prevent the voltage from being fed back to the auxiliary power $V_{dd}$.

The control circuit 23 is electrically connected with the protection circuit 21 and the storage circuit 22, and receives a first control signal S1, a second control signal S2, a third control signal S3 and a fourth control signal S4.

The bridge circuit 24 is electrically connected with the control circuit 23. In this embodiment, the bridge circuit 24 has a first switching unit Q1, a second switching unit Q2, a third switching unit Q3 and a fourth switching unit Q4, each of which is an NMOS FET. In addition, the source of the first switching unit Q1 and the drain of the second switching unit Q2 are coupled with one end of a motor coil L. The source of the third switching unit Q3 and the drain of the fourth switching unit Q4 are coupled with the other end of the motor coil L. The drain of the first switching unit Q1 and the drain of the third switching unit Q3 are electrically connected with a motor driving power $V_{CC}$, and the source of the second switching unit Q2 and the source of the fourth switching unit Q4 are electrically connected with a ground.

In practice, the control circuit 23 receives the first control signal S1 and the third control signal S3, which are low, and the second control signal S2 and the fourth control signal S4, which are high, in a first operation period, and turns on the second switching unit Q2 and the fourth switching unit Q4 according to the second control signal S2 and the fourth control signal S4, so that the first capacitor C1 and the second capacitor C2 of the storage circuit 22 receive and store the auxiliary power $V_{dd}$. In a second operation period, the control circuit 23 receives the first control signal S1 and the fourth control signal S4, which are high, and the second control signal S2 and the third control signal S3, which are low, and turns on the first switching unit Q1 and the fourth switching unit Q4 according to the first control signal S1 and the fourth control signal S4. In a third operation period, the control circuit 23 receives the first control signal S1 and the fourth control signal S4, which are low, and the second control signal S2 and the third control signal S3, which are high, and turns on the second switching unit Q2 and the third switching unit Q3 according to the second control signal S2 and the third control signal S3.

In addition, it is to be noted that the control circuit 23 of the driving device 2 can start the motor successively in the order from the first operation period to the second operation period and the third operation period, or in the order from the first operation period to the third operation period and the second operation period.

The driving device 2 of the invention will be described in detail with reference to FIG. 3.

The control circuit 23 of the driving device 2 includes a fifth switching unit Q5, a sixth switching unit Q6, a seventh switching unit Q7, an eighth switching unit Q8, a first resistor R1, a second resistor R2, a third resistor R3, a fourth resistor R4, a fifth resistor R5, a sixth resistor R6, a seventh resistor R7 and an eighth resistor R8.

The fifth switching unit Q5 is electrically connected with the first control signal S1 and the ground, and turns on or turns off according to the first control signal S1. One end of the first resistor R1 is electrically connected with one end of the first protection unit D1 of the protection circuit 21, while the other end of the first protection unit D1 is electrically connected with the auxiliary power $V_{dd}$. One end of the second resistor R2 is electrically connected with the other end of the first resistor R1, and the other end of the second resistor R2 is electrically connected with the fifth switching unit Q5. The sixth switching unit Q6 is electrically connected with the first resistor R1, the second resistor R2 and the first capacitor C1 of the storage circuit 22. In this embodiment, the fifth switching unit Q5 is an NMOS FET, while the sixth switching unit Q6 is a PMOS FET.

One end of the third resistor R3 is electrically connected with the sixth switching unit Q6, and the other end of the third resistor R3 is electrically connected with the gate of the first switching unit Q1 of the bridge circuit 24. One end of the fourth resistor R4 is electrically connected with the other end of the third resistor R3, and the other end of the fourth resistor R4 is electrically connected with the source of the first switching unit Q1 of the bridge circuit 24. The third resistor R3 and the fourth resistor R4 are adopted to adjust the speeds of turning on and turning off the first switching unit Q1. In practice, the third resistor R3 and the fourth resistor R4 have to be selected according to the following Formula (1):

$$R4/(R3+R4)*V_{dd} - V_{dd} > 4V \text{ (volts)} \quad (1),$$

wherein $V_{1s}$ is the voltage of the source of the first switching unit Q1.

The seventh switching unit Q7 is electrically connected with the third control signal S3 and the ground, and turns on or turns off according to the third control signal S3. One end of the fifth resistor R5 is electrically connected with one end of the second protection unit D2 of the protection circuit 21, and the other end of the second protection unit D2 is electrically connected with the auxiliary power $V_{dd}$. One end of the sixth resistor R6 is electrically connected with the other end of the fifth resistor R5, and the other end of the sixth resistor R6 is electrically connected with the seventh switching unit Q7. The eighth switching unit Q8 is electrically connected with the fifth resistor R5, the sixth resistor R6 and the second capacitor C2 of the storage circuit 22. In this embodiment, the seventh switching unit Q7 is an NMOS FET, while the eighth switching unit Q8 is a PMOS FET.

One end of the seventh resistor R7 is electrically connected with the eighth switching unit Q8, and the other end of the seventh resistor R7 is electrically connected with the gate of the third switching unit Q3 of the bridge circuit 24. One end of the eighth resistor R8 is electrically connected with the other end of the seventh resistor R7, and the other end of the eighth resistor R8 is electrically connected with the source of the third switching unit Q3 of the bridge circuit 24. The seventh resistor R7 and the eighth resistor R8 are adopted to adjust the speeds of turning on and turning off the third switching unit Q3. In practice, the seventh resistor R7 and the eighth resistor R8 have to be selected according to the following Formula (2):

$$R8/(R7+R8)*V_{dd} - V_{3s} > 4V \text{ (volts)} \quad (2)$$

wherein $V_{3s}$ is the voltage of the source of the third switching unit Q3.

The drain of the first switching unit Q1 of the bridge circuit 24 of the driving device 2 and the drain of the third switching unit Q3 are electrically connected with the motor driving power $V_{CC}$. The source of the second switching unit Q2 and the source of the fourth switching unit Q4 are electrically connected with the ground. In addition, the gate of the second switching unit Q2 and the gate of the fourth switching unit Q4 are respectively electrically connected with the second control signal S2 and the fourth control signal S4, and the second switching unit Q2 and the fourth switching unit Q4 turn on or turn off respectively according to the second control signal S2 and the fourth control signal S4.

The driving method according to the preferred embodiment of the invention will be described with reference to the flow chart of FIG. 4A in conjunction with FIG. 3. The driving method may be used in conjunction with the driving device 2 mentioned hereinabove, while the driving method of the driving device of the brushless DC motor for the fan includes steps S01 to S03. In addition, it is also possible to refer to the schematic illustration of FIG. 5 showing the statuses between the first switching unit Q1 to the eighth switching unit Q8 of the control circuit 23 of the invention and the first control signal S1 to the fourth control signal S4.

In the step S01, the second switching unit Q2 and the fourth switching unit Q4 are turned on respectively according to the second control signal S2 and the fourth control signal S4 in the first operation period, such that the storage circuit 22 receives and stores the auxiliary power $V_{dd}$ in the first operation period.

In practice, the second switching unit Q2 and the fourth switching unit Q4 receive the second control signal S2 and the fourth control signal S4, which are high, and turn on, and the auxiliary power $V_{dd}$ charges the first capacitor C1 and the second capacitor C2 of the storage circuit 22 through the first protection unit D1 and the second protection unit D2. Meanwhile, the first control signal S1 and the third control signal S3 are low-level signals, such that the first switching unit Q1, the third switching unit Q3 and the fifth switching unit Q5 to the eighth switching unit Q8 are in the turn-off state. In addition, when the potentials stored in the first capacitor C1 and the second capacitor C2 reach the potential of the auxiliary power $V_{dd}$, the step S02 is entered.

In the step S02, the first switching unit Q1 and the fourth switching unit Q4 are respectively turned on respectively according to the first control signal S1 and the fourth control signal S4 in the second operation period.

In practice, the fifth switching unit Q5 and the sixth switching unit Q6 are respectively the NMOS FET and the PMOS FET. Thus, when the first control signal S1 has the high level, the fifth switching unit Q5 and the sixth switching unit Q6 are simultaneously turned on, and a discharge path is provided to the first capacitor C1 so that the auxiliary power $V_{dd}$ stored therein is discharged. In addition, the third resistor R3 and the fourth resistor R4 have to be selected according to the requirements of the Formula (1). So, when the first control signal S1 has the high level, the discharge may be performed through the first capacitor C1 to turn on the first switching unit Q1. Furthermore, the fourth switching unit Q4 turns on according to the fourth control signal S4 so that the motor driving power $V_{CC}$ drives the motor through the motor coil L.

Meanwhile, the second control signal S2 and the third control signal S3 are low-level signals. So, the second switching unit Q2, the third switching unit Q3, the seventh switching unit Q7 and the eighth switching unit Q8 are in the turn-off state.

In the step S03, the second switching unit Q2 and the third switching unit Q3 are turned on respectively according to the second control signal S2 and the third control signal S3 in the third operation period.

In practice, the seventh switching unit Q7 and the eighth switching unit Q8 are respectively the NMOS FET and the PMOS FET. So, when the third control signal S3 has the high level, the seventh switching unit Q7 and the eighth switching unit Q8 are simultaneously turned on, and a discharge path is provided to the second capacitor C2, so that the auxiliary power $V_{dd}$ stored therein is discharged. In addition, the seventh resistor R7 and the eighth resistor R8 have to be selected according to the Formula (2). So, when the third control signal S3 has the high level, the discharge can be performed through the second capacitor C2 to turn on the third switching unit Q3. Furthermore, the second switching unit Q2 turns on according to the second control signal S2 so that the motor driving power $V_{CC}$ drives the motor through the motor coil L. Meanwhile, because the first control signal S1 and the fourth control signal S4 are low-level signals, the first switching unit Q1, the fourth switching unit Q4, the fifth switching unit Q5 and the sixth switching unit Q6 are in the turn-off state.

In addition, it is to be noted that after the motor is started through the steps S01 to S03, the steps S02 and S03 can be continuously repeated to keep the motor continuously rotating. However, if the motor has to be restarted after the motor stops, the procedure has to be started from the step S01. In addition, each of the first control signal S1, the second control signal S2, the third control signal S3 and the fourth control signal S4 may be a pulse width modulation (PWM) signal or a DC voltage signal in practice.

Figure 3:
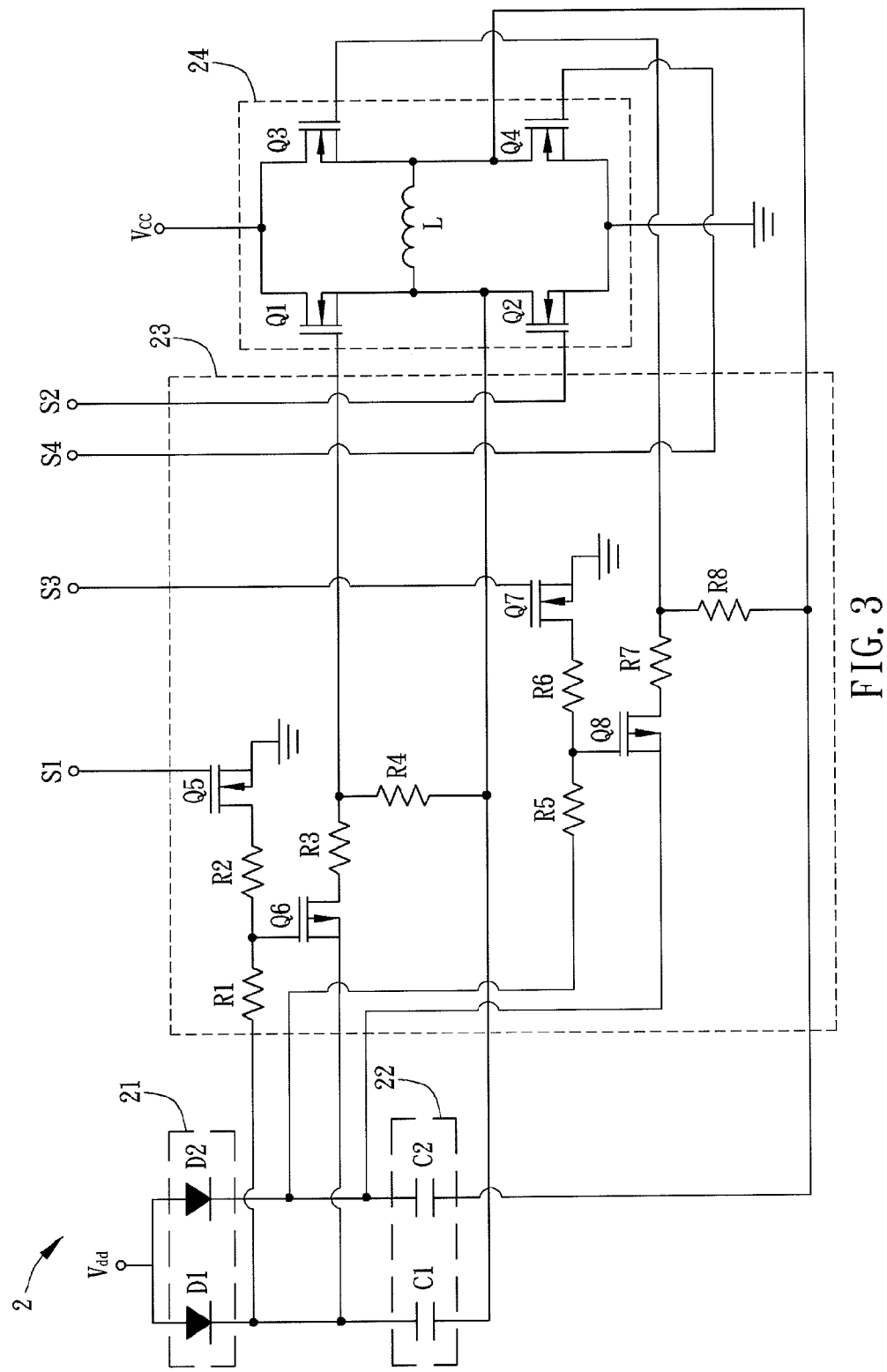
FIG. 3 is a schematic illustration showing a driving device of the brushless DC motor for the fan according to a preferred embodiment of the invention.
Figure 4A:
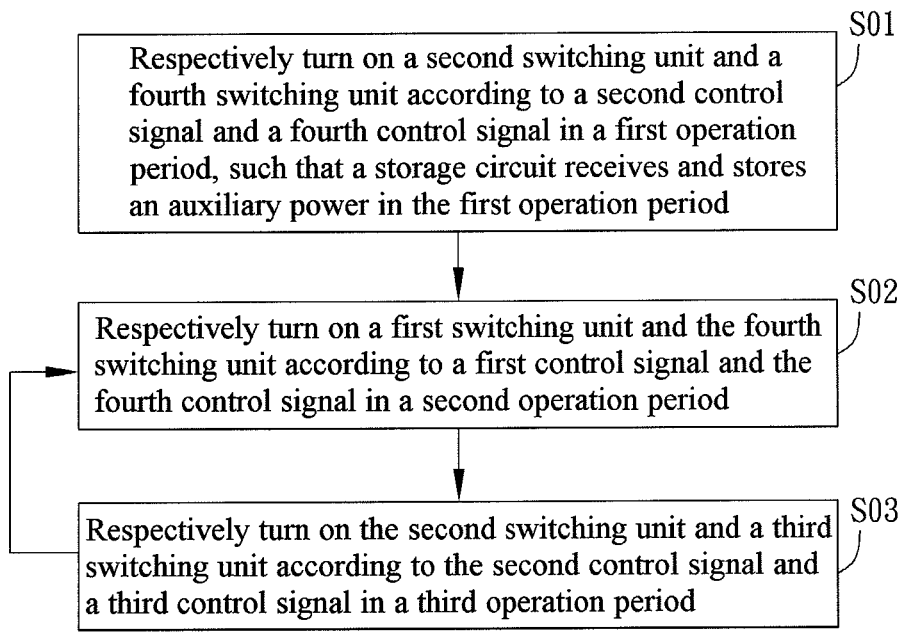
FIG. 4A is a flow chart showing a driving method of the driving device according to the preferred embodiment of the invention.
Figure 4B:
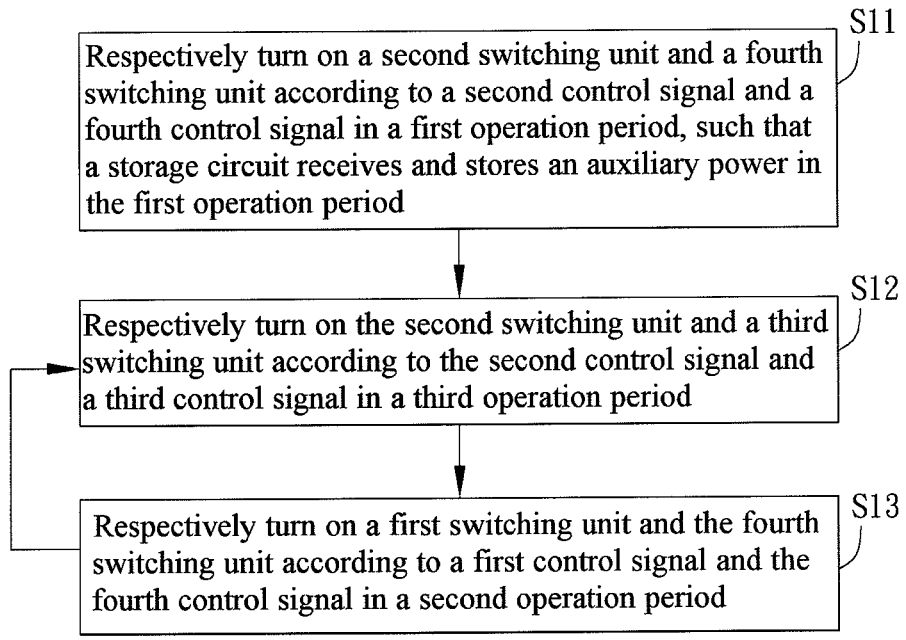
FIG. 4B is a flow chart showing a driving method of the driving device according to another preferred embodiment of the invention.

Next, as shown in the flow chart of FIG. 4B in conjunction with FIG. 3, the driving method according to another preferred embodiment of the invention may be used in conjunction with the driving device 2, while the driving method of the driving device of the brushless DC motor for the fan includes steps S11 to S13. In this embodiment, the motor is started in the order from the step S11 to the step S12 and the step 13, and the motor is kept continuously rotating by continuously repeating the steps S12 and S13. Because the technological features of the steps S11, S12 and S13 are the same as those of the steps S01, S03 and S02, detailed descriptions thereof will be omitted.

With the hardware architecture and the driving method mentioned hereinabove, the first switching unit Q1 and the third switching unit Q3 can turn on when the voltage of the auxiliary power $V_{dd}$ ranges between 4 and 20 volts. Thus, the invention has the wider range of the operation voltage, and can be applied to the driving of the motors with different requirements and designs more widely.

To sum up, the driving device of the brushless DC motor for the fan and the driving method thereof according to the invention provide the voltage levels, required to turn on the first switching unit and the third switching unit of the bridge circuit, using the storage circuit in conjunction with the control circuit. Thus, the simple structure can be implemented, the wider range of the operation voltage can be obtained, and the utility of the driving device and the quality of the motor can be enhanced.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A driving device of a brushless DC motor for a fan, the driving device comprising:
   a protection circuit electrically connected with an auxiliary power;
   a storage circuit electrically connected with the protection circuit;
   a control circuit electrically connected with the protection circuit and the storage circuit for receiving a first control signal, a second control signal, a third control signal and a fourth control signal; and
   a bridge circuit electrically connected with the control circuit and having a first switching unit, a second switching unit, a third switching unit and a fourth switching unit, wherein the first switching unit and the second switching unit are coupled with one end of a motor coil, the third switching unit and the fourth switching unit are coupled with the other end of the motor coil, the first switching unit is electrically connected with the third switching unit, and the second switching unit is electrically connected with the fourth switching unit,
   wherein the control circuit turns on the second switching unit and the fourth switching unit in a first operation period, turns on the first switching unit and the fourth switching unit in a second operation period, and turns on the second switching unit and the third switching unit in a third operation period, and the storage circuit receives the auxiliary power in the first operation period.

2. The driving device according to claim 1, wherein the protection circuit comprises a first protection unit and a second protection unit.

3. The driving device according to claim 2, wherein each of the first protection unit and the second protection unit is a diode.

4. The driving device according to claim 1, wherein the storage circuit comprises a first capacitor and a second capacitor.

5. The driving device according to claim 1, wherein each of the first switching unit, the second switching unit, the third switching unit and the fourth switching unit of the bridge circuit is an N-type metal-oxide semiconductor (NMOS) field-effect transistor (FET).

6. The driving device according to claim 1, wherein the first switching unit and the third switching unit are electrically connected with a motor driving power.

7. The driving device according to claim 1, wherein the second switching unit and the fourth switching unit are electrically connected with a ground.

8. The driving device according to claim 1, wherein the control circuit comprises:
   a fifth switching unit electrically connected with the first control signal;
   a first resistor having one end electrically connected with the protection circuit;
   a second resistor having one end electrically connected with the first resistor, and the other end electrically connected with the fifth switching unit;
   a sixth switching unit electrically connected with the first resistor, the second resistor and the storage circuit;
   a third resistor having one end electrically connected with the sixth switching unit, and the other end electrically connected with the first switching unit of the bridge circuit;
   a fourth resistor having one end electrically connected with the other end of the third resistor, and the other end electrically connected with one end of the first switching unit of the bridge circuit;
   a seventh switching unit electrically connected with the third control signal;
   a fifth resistor having one end electrically connected with the protection circuit;
   a sixth resistor having one end electrically connected with the fifth resistor, and the other end electrically connected with the seventh switching unit;
   an eighth switching unit electrically connected with the fifth resistor, the sixth resistor and the storage circuit;
   a seventh resistor having one end electrically connected with the eighth switching unit, and the other end electrically connected with the third switching unit of the bridge circuit; and
   an eighth resistor having one end electrically connected with the other end of the seventh resistor, and the other end electrically connected with one end of the third switching unit of the bridge circuit.

9. The driving device according to claim 8, wherein each of the fifth switching unit and the seventh switching unit is an NMOS FET, and each of the sixth switching unit and the eighth switching unit is a P-type metal-oxide semiconductor (PMOS) FET.

10. A driving method of a brushless DC motor for a fan being used in conjunction with a driving device, wherein the driving device has a protection circuit, a storage circuit, a control circuit and a bridge circuit, the protection circuit is electrically connected with an auxiliary power, the storage circuit is electrically connected with the protection circuit, the control circuit is electrically connected with the protection circuit and the storage circuit and receives a first control signal, a second control signal, a third control signal and a fourth control signal, the bridge circuit is electrically connected with the control circuit, and the bridge circuit has a first switching unit, a second switching unit, a third switching unit and a fourth switching unit, wherein the first switching unit and the second switching unit are coupled with one end of a motor coil, the third switching unit and the fourth switching unit are coupled with the other end of the motor coil, the first switching unit is electrically connected with the third switching unit, and the second switching unit is electrically connected with the fourth switching unit, the driving method comprising:

respectively turning on the second switching unit and the fourth switching unit according to the second control signal and the fourth control signal in a first operation period, such that the storage circuit receives and stores the auxiliary power in the first operation period, and enters one of a second operation period and a third operation period;

respectively turning on the first switching unit and the fourth switching unit according to the first control signal and the fourth control signal in the second operation period, and entering the third operation period; and respectively turning on the second switching unit and the third switching unit according to the second control signal and the third control signal in the third operation period, and entering the second operation period.

11. The driving method according to claim 10, wherein each of the first control signal, the second control signal, the third control signal, and the fourth control signal is a pulse width modulation (PWM) signal or a DC voltage signal.

12. The driving method according to claim 10, wherein the voltage of the auxiliary power ranges between 4 and 20 volts.

* * * * *